United States Patent [19]
Verrijp et al.

[11] Patent Number: 5,429,549
[45] Date of Patent: Jul. 4, 1995

[54] SEQUENTIAL WING REMOVER

[75] Inventors: Bastiaan Verrijp, Numansdorp; Dirk C. Stooker, s'Gravendeel; Jacobus E. Hazenbroek, Numansdorp, all of Netherlands

[73] Assignee: Systemate Holland, B.V., Numansdorp, Netherlands

[21] Appl. No.: 318,270

[22] Filed: Oct. 5, 1994

[51] Int. Cl.$^6$ ............................................. A22C 21/00
[52] U.S. Cl. .................................. 452/169; 452/167; 452/154
[58] Field of Search ............... 452/169, 167, 166, 151, 452/154, 155

[56] References Cited

U.S. PATENT DOCUMENTS

| | | | |
|---|---|---|---|
| 4,597,136 | 7/1986 | Hazenbroek | 452/169 |
| 4,827,570 | 5/1989 | Scheier et al. | 452/169 |
| 4,935,990 | 6/1990 | Linnenbank | 452/169 |
| 5,176,564 | 1/1993 | Hazenbroek | 452/167 |
| 5,188,560 | 2/1993 | Hazenbroek | 452/169 |

FOREIGN PATENT DOCUMENTS 323661  12/1988  European Pat. Off. ............ 452/169

Primary Examiner—Willis Little
Attorney, Agent, or Firm—Hopkins & Thomas

[57] ABSTRACT

A method and apparatus for removing the wings of birds as the birds are conveyed along a poultry processing line suspended by their legs. As the birds are carried through the wing remover (10), the wings on one side of the birds are engaged by a first wing guide means (40), which tends to spread the wings. This spreading of the wings dislocates the joints between the wings and shoulders of the birds and pulls a desired quantity of meat from the breasts. The birds are thereafter engaged by a first cutting means (56), which separates the wings and the portions of breast meat from the birds. At the same time, the wings on the opposite sides of the birds are engaged by a second wing guide means (41), which tends to spread the wings, dislocating the shoulder joints between the wings and shoulders of the bird and pulling a desired quantity of meat from the breasts. The dislocated shoulder joints are thereafter engaged by a second cutting means (81), which separates the wings and pulled breast meat from the birds.

14 Claims, 6 Drawing Sheets

SEQUENTIAL WING REMOVER

FIELD OF THE INVENTION

The present invention relates to a method and apparatus for processing previously eviscerated poultry carcasses. More particularly, the present invention relates to a method and apparatus for removing the wings one at a time from the carcasses of birds by dislocating the shoulder joints between the wings and the carcasses and cutting through the dislocated joints, with a desired amount of breast meat being removed with the removal of the wings as the birds move in spaced series suspended by their legs along a poultry processing line.

BACKGROUND OF THE INVENTION

In recent years, the processing of poultry such as chickens and turkeys has become highly automated, with the birds being conveyed suspended by their legs from overhead conveying systems along processing lines for evisceration, cut-up, and further processing. It is highly desirable to perform as many of the processing steps on the birds as possible while the birds are suspended from their overhead conveying lines to minimize handling and ensure greater uniformity in the cutting up and processing of the birds. Accordingly, the birds are conveyed into engagement with various processing apparatus while they move in series suspended from the overhead conveying system along a processing line. For example, the birds can be de-feathered, decapitated, opened, eviscerated, and cut apart while advanced progressively through a poultry processing plant suspended from an overhead conveyor line. As a result, the labor required for processing poultry carcasses has been significantly reduced while uniformity and adjustability in the sectioning of the poultry carcasses into various parts has increased.

Recently, a growing trend in snack foods has been the increasing popularity of chicken wings, often called "Buffalo Wings". These are especially popular as appetizers or snack foods served in bars. Additionally, chicken wings have become a popular takeout item for home consumption and restaurants and fast food outlets. As wings have become more popular, however, consumers now demand larger and meatier wings. This extra meat must necessarily be taken from the breast and back portions of the birds. Accordingly, care must be taken to insure that a precise desired quantity of meat is pulled from each breast as the wings are removed to meet the specifications of the retailers purchasing the wings. To ensure efficiency and proper cooking of the wings, it is important to retailers such as fast food outlets that all the wings being cooked be of substantially the same weight. Larger wings do not cook as fast as smaller wings, and thus there is a possibility that the larger wings of a batch with smaller wings will be undercooked or that the smaller wings in a batch with larger wings will be overcooked. The result is poor quality product that generally is discarded. Accordingly, it is important that precise, equal amounts of breast meat be removed with the wings from the poultry carcass to ensure that each wing and its attached breast meat will be of a substantially equal size and weight.

Formerly, the removal of the wings of the birds was largely done by hand or by stand alone wing removal machines. For example, U.S. Pat. No. 4,993,115 of Hazenbroek discloses a compact wing cutoff machine for removing the wings from the carcasses of poultry with a minimal amount of breast meat being removed therewith. Automated poultry wing removal apparatus have been developed for severing or cutting the wings from poultry carcasses as the poultry carcasses are suspended from an overhead conveyor system and are conveyed through a processing plant. An example of such an apparatus is disclosed in U.S. Pat. No. 4,597,136 of Hazenbroek.

Such automated wing removal apparatus, generally have, however, been limited to removing and cutting up of the wings without requiring additional breast meat to remain attached to the wings. Thus, conventional automated wing removal apparatus typically have not been able to remove the wings with a precise amount of breast meat being removed therewith to ensure uniformity of the size of the wings as required by most fast food retailers. Such conventional wing removal apparatus further are not designed to accommodate birds of varying sizes for removal of the wings therefrom with substantially equal amounts of meat from the breasts, backs, and/or shoulders being removed therewith.

Accordingly, it can be seen that a need exists for a method and apparatus for cleanly and accurately removing the wings from the carcasses of birds as the birds are conveyed by an overhead conveyor system through a poultry processing plant, with a desired, substantially equal amount of breast meat automatically removed from the carcasses with the removal of the wings.

SUMMARY OF THE INVENTION

Briefly described, the present invention comprises a method and apparatus for removing the wings from the carcasses of birds as the birds are moved along a processing path suspended by their legs from an overhead conveyor line. The birds are moved along their processing path with their backs leading, their breasts trailing and their necks hanging below the shoulders, legs and thighs of the birds. The wing remover is mounted along the processing path of the birds in a position to engage the birds suspended from the overhead conveyor line.

A longitudinal guide rail positioned in the path of the movement of the birds, extending through the wing remover substantially parallel to the processing path of the birds. The longitudinal guide rail is a substantially U-shaped rectilinear channel or beam having a proximal or input end and a distal or exit end. The longitudinal guide rail further includes a lower base surface and a pair of upstanding spaced parallel side walls defining a neck receiving channel therebetween. The necks of the birds are received within the neck receiving channel and are guided along the length of the longitudinal guide rail as birds are conveyed along their processing path.

As the birds engage and move along the longitudinal guide rail, the wings of the birds are removed from the birds one at a time at different positions along the guide rail. The wings on the right side portions of the birds engage a first wing guide means positioned along the longitudinal guide rail adjacent the proximal end thereof. The first wing guide means includes a first guide plate mounted adjacent and extending parallel to the longitudinal guide rail. The first guide plate generally is a substantially rectangularly shaped plate having a proximal end and a distal end, and is positioned so as to be engaged by the wings of the birds which slide therealong.

Wing guide rails are mounted to the first guide plate. A first one of the wing guide rails is mounted along an inner edge of the first guide plate adjacent the longitudinal guide rail. This wing guide rail extends along the length of the first guide plate, curving downwardly at the distal end of the first wing guide plate. A second wing guide rail is mounted to the distal end of the first guide plate, curving downwardly and outwardly therefrom.

A first guide sprocket is rotatably mounted below the first guide plate, positioned at an angle with respect to the longitudinal guide rail. The first guide sprocket is a circular wheel or disc having a series of spaced teeth formed about its circumference. The first guide sprocket is rotatable substantially in the direction of movement of the bird through the wing removal apparatus. As the birds are moved along the longitudinal guide rail, the wings are engaged between the teeth of the first guide sprocket and the wing guide rails, causing the first guide sprocket to rotate. As a result, the wings are pulled and spread outwardly and away from the carcasses of the birds by the movement of the wings along the wing guide rails by the guide sprocket.

This spreading motion tends to dislocate and separate the shoulder joints between the wings and the carcasses, stretching taut the tendons and ligaments between the wings and shoulders. At the same time, the birds are pulled against the side wall of the longitudinal guide rail. As a result, a desired quantity of the meat from the right side portions of the breasts is pulled from the breasts for removal with the wings and the dislocated shoulder joints become positioned in the proper alignment for accurate cutting therethrough.

A first cutting means is positioned immediately downstream from the guide sprocket and proximate end of the first guide plate. The cutting means typically is a rotary disc cutter having a substantially circular disc cutting blade. The cutting blade is positioned so as to automatically engage and cut through the separated shoulder joints between each wing and its carcass. As a result, the wings are completely and accurately severed from the birds with a desired quantity of meat from the breasts removed with each wing.

As the wings are being cut from the right side portions of the bird, the wings on the left sides of the birds become engaged by a second guide means. The second guide means is mounted on the opposite side of the longitudinal guide rail from the first guide means approximately positioned opposite the first cutting means. The second guide means includes a second guide plate mounted parallel to and extending partially along the length of the longitudinal guide rail. The guide plate is a substantially rectangularly shaped metal plate having a proximal end and distal end. A first wing guide rail is mounted to the second guide plate, extending therealong and curves downwardly at the distal end of the second guide plate. A second wing guide rail is mounted to the distal end of the second guide plate, curving downwardly and slightly outwardly therefrom.

A second guide sprocket is rotatably mounted beneath the second guide plate, oriented at an angle with respect to the longitudinal guide rail. The guide sprocket is a substantially circular disc or wheel having a series of teeth arranged at spaced intervals about its circumference. The teeth of the guide sprocket are adapted to engage the wings on the left sides of the birds against the wing guide rails as the wings engage the second guide means. As the birds are conveyed forwardly, the second guide sprocket is rotated, causing its teeth to engage and pull the wings away from the carcasses. As a result, the wings on the left sides of the birds are spread outwardly from the carcasses. This spreading of the wings causes the shoulder joints between the wings and the carcasses to be dislocated and separated. At the same time, the birds are pulled against the right side wall of the longitudinal guide rail so that a desired quantity of meat is pulled from the left side portions of the breasts of the birds for removal with the wings and the dislocated shoulder joints are properly positioned for accurate cutting therethrough.

A second cutting means is positioned immediately downstream from the second guide means. The second cutting means is positioned at a slightly staggered interval from the first cutting means on the opposite side of the longitudinal cutting means from the first cutting means, forming a cutting area or zone therewith. The second cutting means typically is a rotary disc cutter having a substantially circular disc cutting blade. The cutting blade is positioned so as to engage and cut automatically through the opened, dislocated shoulder joints of the birds in order to cut the wings from the birds. The wings accordingly are separated from the left side portions of the birds with a desired quantity of breast meat that is substantially equal to the quantity of meat removed with the wings of the right side portions of the birds being removed with the wings.

Accordingly, it is an object of the present invention to provide an improved method and apparatus for automatically removing the wings of birds.

Another object of the present invention is to reduce the manual handling of birds as the wings of the birds are removed in an automated poultry processing system.

Another object of the present invention is to provide an improved method and apparatus for cleanly and accurately removing the wings of birds with a desired equal quantity of breast meat being removed with both of the wings.

Another object of the present invention is to provide an apparatus for cleanly and accurately removing the wings from birds being conveyed in series suspended by their legs from overhead conveyor lines that is able to accommodate birds of varying sizes.

Another object of the invention is to provide a method and apparatus for removing the wings of a poultry carcass one at a time so that the removal procedure at one side of the bird is not interfered with by the removal procedure at the other side of the bird.

Other objects, features and advantages of the present invention will become apparent from the following specification, when read in conjunction with the accompanying drawings.

DETAILED DESCRIPTION

Figure 1:
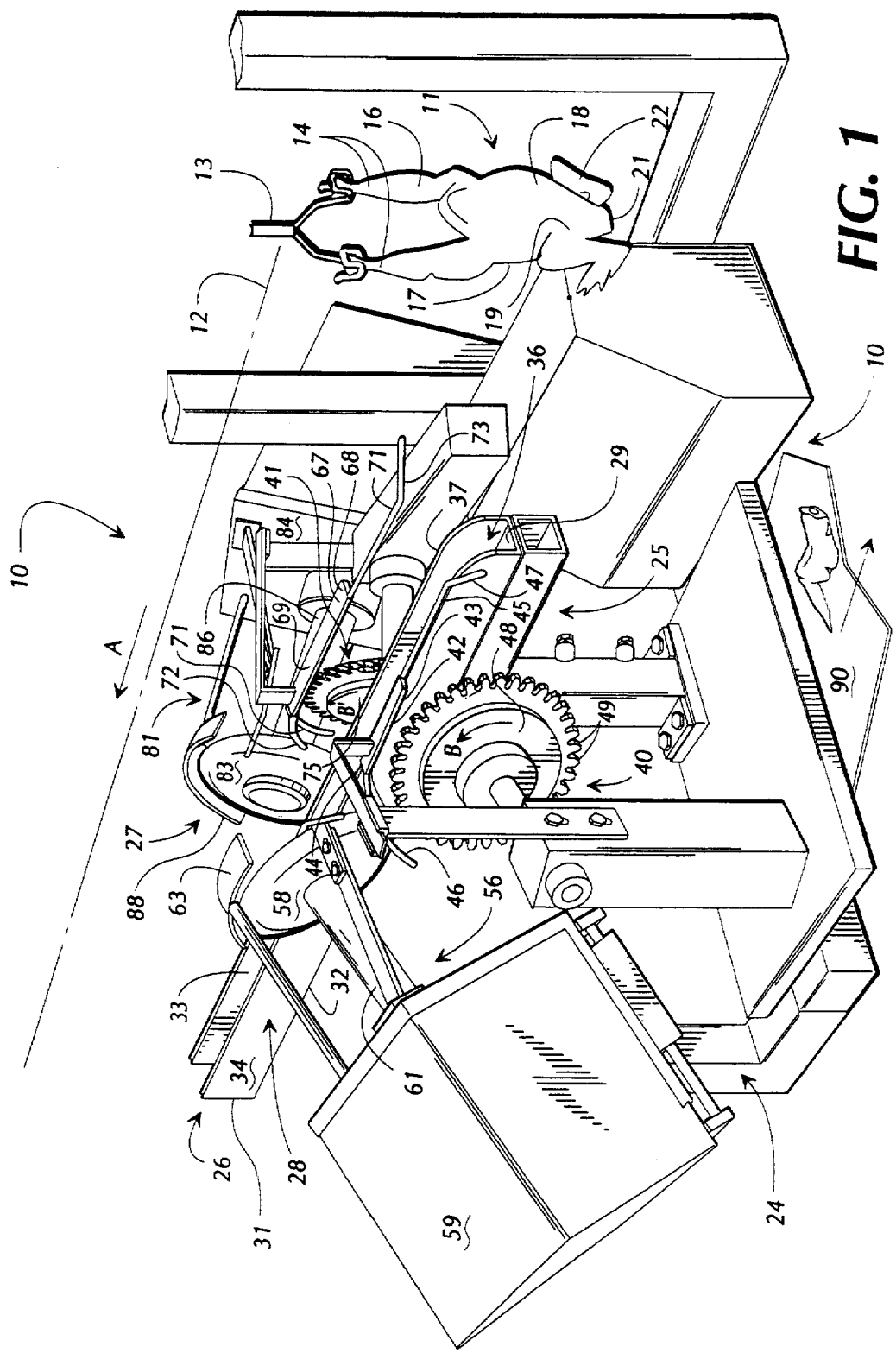
FIG. 1 is a perspective illustration of the wing remover apparatus of the present invention mounted along a poultry processing line.

Referring now in greater detail to the drawings in which like numerals indicate like parts throughout the several views, FIG. 1 illustrates the wing remover 10 for removing the wings from birds 11 moving in spaced series suspended from an overhead conveyor line 12 on shackles 13. Each of the birds 11 generally has been previously eviscerated and processed for segmenting by a cut-up line. The birds each include legs 14, thighs 16, back 17, breast 18, shoulders 19, and a neck portion 21, which comprise the carcass of the bird, and wings 22. The birds are conveyed by the overhead conveyor line 12 along a processing path indicated by arrows A suspended by their legs from shackles 13 with their backs 17 leading and breasts 18 trailing and with their neck portions 21 hanging downwardly. Typically, the breasts of the birds will be uncut prior to engaging the wing remover 10.

As FIG. 1 illustrates, the wing remover 10 is mounted along the processing path of the birds at an elevation to receive and engage the birds as the birds are conveyed by the overhead conveyor line. The wing remover 10 includes an adjustable framework 24 suspended from an overhead support (not shown) of the poultry cut-up line. The wing remover 10 further has a proximal end 25 at which the birds 11 are received and a distal end 26 from which the birds are discharged. A cutting area or zone 27 is formed adjacent the distal end 26, in which time the wings are removed as the birds are moved through the wing remover.

A longitudinal guide rail 28 is mounted to the framework 24 extending substantially centrally through the wing remover 10. The longitudinal guide rail is positioned along and is substantially aligned with the processing path of the birds 11. The longitudinal guide rail generally is formed from metal such as stainless steel, or similar material, and includes a substantially pointed or conically shaped proximal end 29 which projects from the proximal end 25 of the wing remover, and a distal end 31 at the distal end 26 of the wing remover 10.

Figure 2:
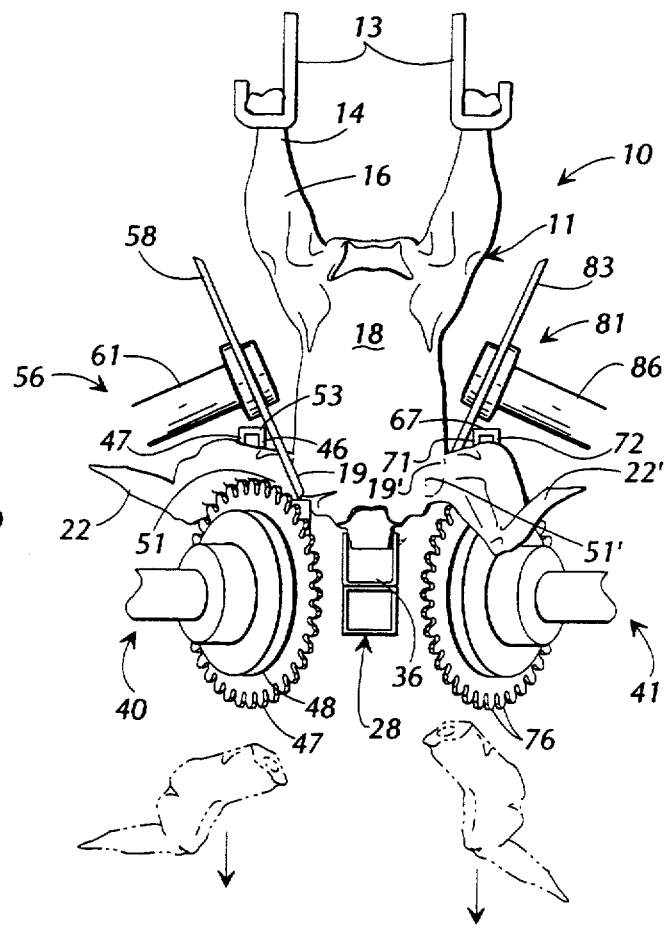
FIG. 2 is an end view of the wing remover with parts cut away showing the spreading of the wing by the first and second guide means and the cutting away of the wings with the first and second cutting means.

As shown in FIGS. 1 and 2, the longitudinal guide rail is a substantially U-shaped beam having a substantially flat base portion 32, and an upstanding right sidewall 33 and a upstanding left sidewall 34 extending vertically from the base portion. The sidewalls 33 and 34 define an open-ended neck receiving channel or passage 36 that extends along the length of the longitudinal guide rail 28 between the proximal and distal ends thereof. As the birds 11 enter the wing remover 10, their neck portions 21 are received within and pass along the neck receiving channel 36 of the longitudinal guide rail 28. The engagement of the neck portions of the birds in the neck receiving channel helps stabilize and maintain the position of the birds during the removal of the wings.

Figure 3:
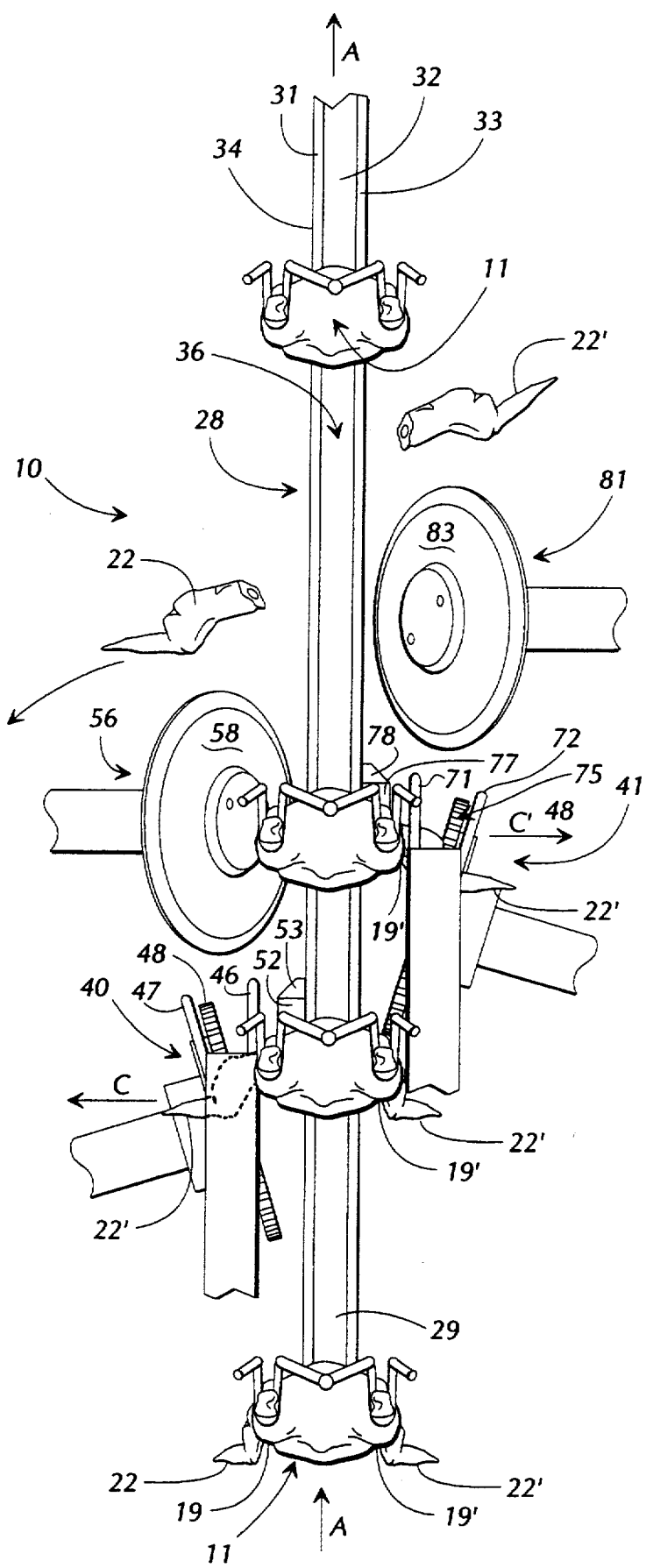
FIG. 3 is a plan view, schematically illustrating the movement of the birds along the longitudinal guide rail for removal of the wings.

As FIGS. 1 and 3 illustrate, a first wing guide means 40 and a second wing guide means 41 are positioned along the length of the longitudinal guide rail 28 on opposite sides thereof. The first and second wing guide means are positioned on opposites sides of the longitudinal guide rails, at staggered intervals along the processing path of the bird 11 and function as a means for spreading the wings from the carcasses of the birds. As a result, the wings 22 and 22' (FIGS. 2 and 3) on the right and left side portions of the birds are engaged at staggered intervals for removal.

The first guide means 40 includes a substantially horizontally oriented first guide plate 42 (FIG. 1) mounted to the adjustable framework 25 of the wing remover 10. The first guide plate 42 is mounted at an elevation sufficient to engage the birds between the thighs 16 and wings 22 and 22' (FIG. 2) of the birds with the wings passing beneath the first guide plate, and extends partially along the length of the longitudinal guide rail. The first guide plate 42 is generally a substantially rectangularly shaped plate, and is formed from a metal such as stainless steel or similar material, as shown in FIG. 1, the first guide plate has a proximal end 43, aligned adjacent the proximal end of the longitudinal guide rail 28 and a distal end 44 positioned along the length of the longitudinal guide rail.

A pair of wing guide rails 45 and 46 are mounted to the first guide plate 42. The wing guide rails are elongated rods or bars generally formed from a metal such as steel or similar material. Wing guide rail 45 is mounted to an inner facing edge of the first guide plate adjacent the longitudinal guide rail, and extends substantially along the length of the first guide plate. A first end 47 of wing guide rail 45 projects outwardly from the proximal end 43 of the guide plate, curving outwardly and away from the proximal end 29 of the longitudinal guide rail 28. Thus, as the birds enter the wing remover 10, they are guided toward the longitudinal guide rail 28 by the first end 47 of wing guide rail 45. As FIG. 1 illustrates, wing guide rail 45 curves downwardly from the distal end 44 of the first guide plate 42. Wing guide rail 46 is mounted to the distal end 44 of the first guide plate 42 and curves downwardly and outwardly, away from the longitudinal guide rail 28. The wings 22 on the right side portions of the birds engage and slide along the wing guide rails as the birds move through the wing remover. As a result, the wings are directed downwardly and outwardly, away from the longitudinal guide rail.

Figure 4:
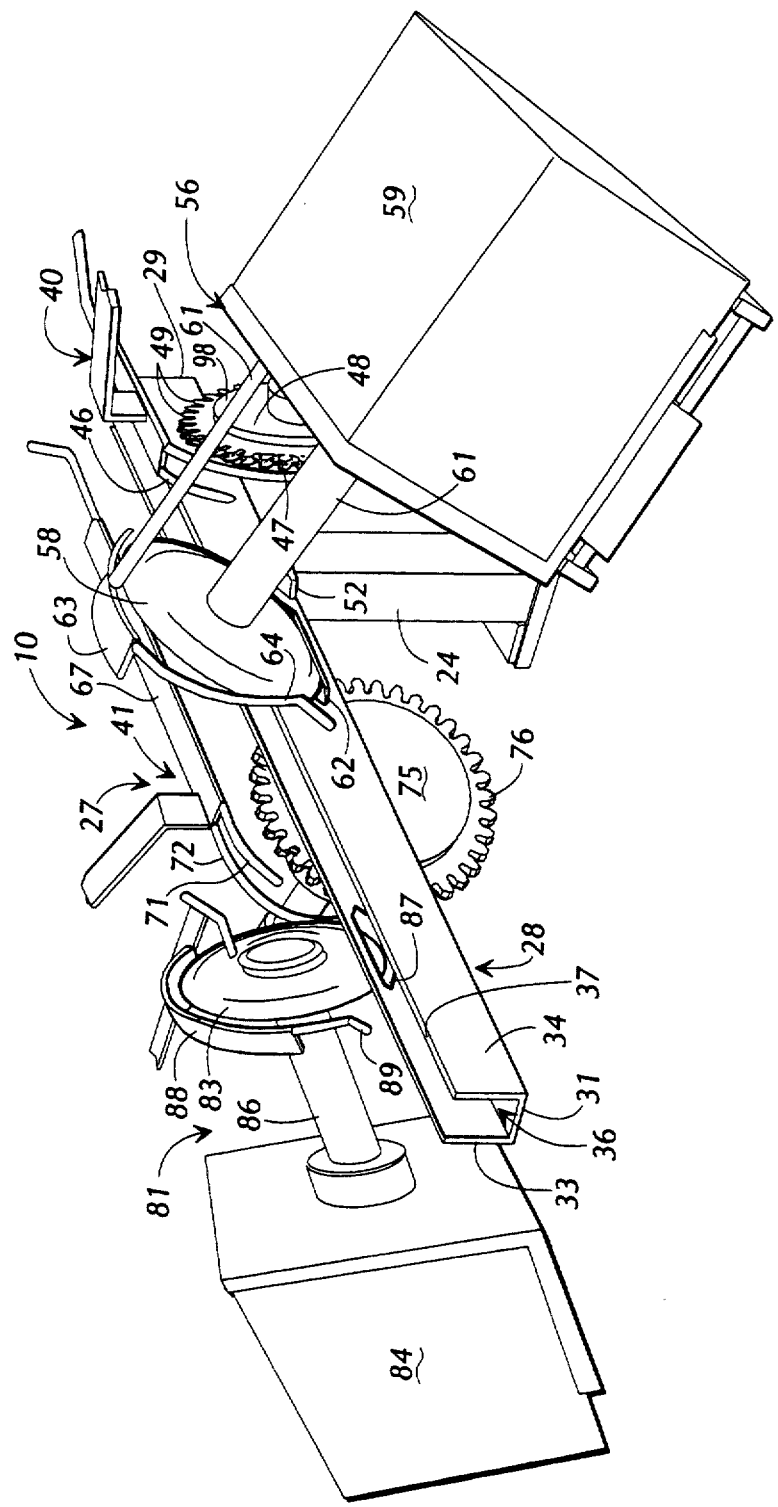
FIG. 4 is a perspective illustration of the cutting area of the wing remover.

As shown in FIGS. 1, 2, and 3, a first guide sprocket 48 is rotatably mounted to the adjustable framework, positioned beneath the first guide plate 42 (FIGS. 1 and 2). The first guide sprocket is oriented at an angle with respect to the longitudinal guide rail 28, substantially aligned with the wing guide rails 45 and 46. As shown in FIGS. 2, 3 and 4, the first guide sprocket is a substantially circular shaped disc formed from a nylon or plastic material and has a series of spaced teeth 49 formed about its circumference. The teeth 49 of the first guide sprocket are adapted to engage the wings 22 of the birds against the first guide plate and the wing guide rails 45 and 46 as the birds are moved along the longitudinal guide rail.

Figure 5A:
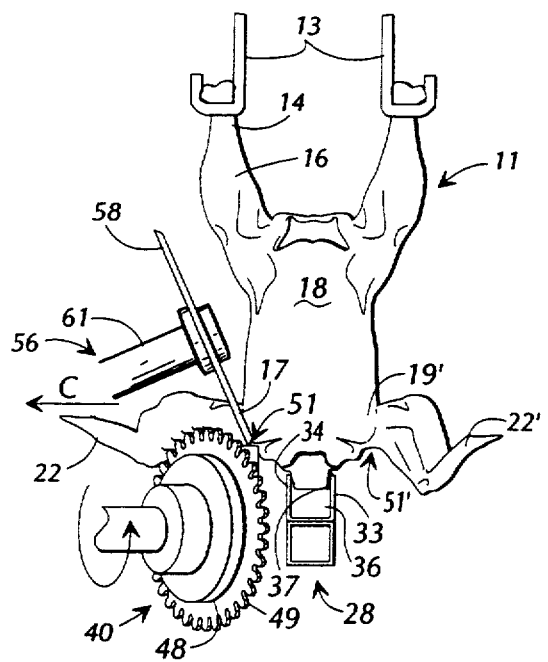
FIGS. 5a–5d are end views schematically illustrating the process by which the wings are spread outwardly and removed from the carcasses of the birds.
Figure 5B:
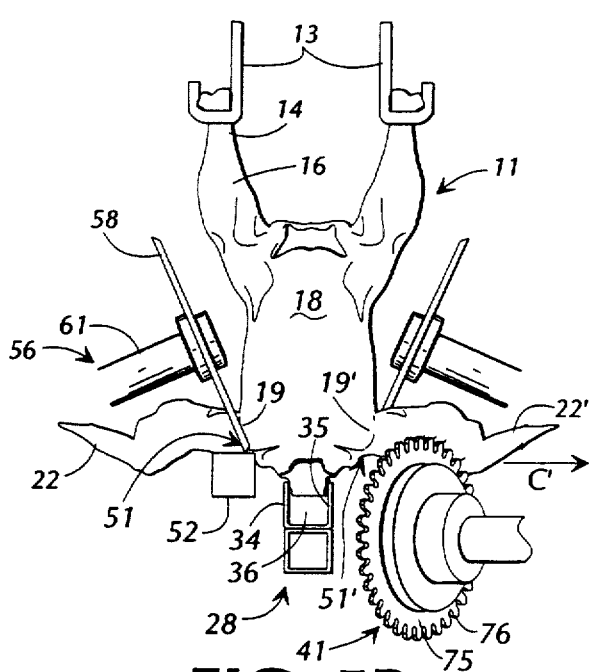

The first guide sprocket tends to rotate in the direction of arrow B as the birds are moved along the length of the overhead conveyor line, causing the wings 22 to be pulled along the wing guide rails and thus to be spread outwardly from the carcasses of the birds. This spreading of the wings 22 tends to open the shoulder joints 51 between the shoulders 19 and wings 22 of the birds. The shoulder joints are thus dislocated and the wings are pulled outwardly as shown in FIGS. 5a and 5b. Further, the necks of the birds are pulled against the left side wall of the longitudinal guide rail so that a desired quantity of meat is stretched and pulled from the right side portions of the breasts 18 with the wings for removal with the wings.

As shown in FIG. 4, a cutting block 52 is mounted adjacent the longitudinal guide rail 28, positioned below the distal end 44 of first guide plate 42. The cutting block is generally cubically shaped and is formed from nylon or a similar plastic material. The cutting block has an angled bearing surface 53 facing along the path of movement of the birds. The cutting block is positioned in the path of movement of the birds so that the dislocated shoulder joints 51 (FIGS. 5b and 5c) engage and tend to ride over the angled bearing surface. The positioning of the opened shoulder joints on the cutting block then insures that the shoulder joints are aligned at the proper position and angle for cutting.

As shown in FIGS. 1 to 4, a first cutting means 56 is positioned along the length of the longitudinal guide rail 28 in cutting zone 27, immediately downstream from the cutting block of the first wing guide means 40. The first cutting means 56 generally includes a rotary disc cutter 57 having a substantially circular disc cutting blade 58. A drive motor 59 for the first cutting means 56 is adjustably mounted to the adjustable framework 25 (FIG. 1) and includes a drive shaft 61 projecting therefrom. The cutting blade 58 is mounted to drive shaft 61 and is rotated with the rotation of the drive shaft by drive motor 59. The adjustable mounting of the drive motor to the wing remover framework also enables the position of the cutting blade to be adjusted with respect to the longitudinal guide rail. Thus, the orientation and elevation of the cutting blade can be set as necessary to accommodate birds 11 of varying sizes and for adjustment of the quantity of meat to be removed from the breasts of the birds with the wings.

As FIG. 4 illustrates, the cutting blade 58 is oriented at an angle with respect to the longitudinal guide rail 40 and is positioned so as to slightly overlap the bearing surface 53 of cutting block 52. A slotted opening or gap 62 is formed in sidewall 34 of the longitudinal guide rail 28. This slot 62 is formed adjacent the cutting blade 58 so that the cutting blade partially projects into the slot. As a result, the cutting blade is properly positioned to cut completely through the shoulder joints 51 (FIG. 2) of the birds 11 to insure complete removal of the wings 22 from the right sides of the bird with a desired quantity of additional meat being removed therewith.

As FIG. 4 illustrates, a shield 63 is mounted over the cutting blade 58, partially covering the outer edge of the cutting blade. The shield 63 is a substantially semicircular shaped metal plate which covers the outer edge of the cutting blade to prevent inadvertent contact with the cutting blade by workers, etc. A guide bar 64 is mounted to the downstream end of the shield 63, extending downwardly therefrom adjacent the cutting blade 58. The partially cut away wings engage in the guide bar 64 as the wings 22 are being cut from the right sides of the birds. This tends to urge the wings, away from the cutting blade to prevent the wings from contacting the cutting blade and interfering with the separation of the wings from the carcasses of the birds.

As FIG. 1 and 3 illustrate, the second guide means 41 is positioned downstream from the first guide means 40 on the opposite side of the longitudinal guide rail 28, adjacent right sidewall 33 thereof, approximately aligned with the first cutting means 56. The second guide means has a substantially similar construction to the first guide means. As shown in FIG. 1, the second guide means, includes a substantially horizontally oriented second guide plate 67 mounted to the adjustable framework 25 at an elevation sufficient to engage the birds between the thighs 16 and wings 22' (FIGS. 2 and 5B), with the wings passing beneath the second guide plate. The second guide plate is a substantially rectangularly shaped plate generally formed from metal such as stainless steel or similar material, and is of a substantially greater length than the first guide plate 42. The second guide plate includes a proximal end 68 (FIG. 1) positioned adjacent the proximal end 29 of the longitudinal guide rail 28 and a distal end 69 positioned along the longitudinal guide rail. The second guide plate 67 extends partially along the length of the longitudinal guide rail, parallel to sidewall 33 thereof.

A pair of wing guide rails 71 and 72 are mounted to the second guide plate 67. As FIGS. 1 and 3 illustrate, wing guide rail 71 is mounted to an inner facing edge of the second guide plate adjacent the longitudinal guide rail and extends substantially along the length of the second guide plate. A first end 73 of wing guide rail 71 projects from the proximal end of the second guide plate, curving outwardly from the proximal end of the longitudinal guide rail. As with wing guide rail 45, the curved, outwardly projecting end 73 of wing guide rail 71 serves to help steady and to direct the birds 11 toward the center of the longitudinal guide rail 28 as the birds enter the wing remover 10. As FIG. 1 shows, wing guide rail 71 extends past and curves downwardly from the distal end 69 of the second guide plate 67. Wing guide rail 72 is mounted to the distal end 69 of the second guide plate 67, curving downwardly and outwardly, away from the longitudinal guide rail 28. The wings 22' (FIG. 5B) engage and slide along the wing guide rails 71 and 72 (FIG. 1), and are thus urged downwardly and outwardly as the wings slide along the underside of the guide plate, along guide rails 71 and 72.

As shown in FIGS. 1 through 3, a second guide sprocket 75 is rotatably mounted to the adjustable framework, positioned along the path of movement of the birds through the wing remover. The second guide sprocket 75 is substantially aligned with the wing guide rails 71 and 72 (FIG. 1) and is oriented at an angle with respect to the longitudinal guide rail. As shown in FIGS. 2 and 5B, the second guide sprocket 75 is rotatable in the direction of arrow B'. A series of spaced teeth 76 are formed about the circumference of the second guide sprocket. The teeth are adapted to engage and pull the wings 22' of the birds outwardly as the wings on the right sides of the birds are cut away by the first cutting means 56.

Consequently, as the birds are moved along the longitudinal guide rail, the wings 22' are engaged between the second guide plate and the wing guide rails 71 and 72 and the teeth of the second guide sprocket. The second guide sprocket is accordingly rotated in response to the further movement of the birds, causing the wings 22' on the left side portions of the birds to be pulled along wing guide rails 71 and 72 and spread outwardly as shown in FIG. 5B. As a result, the shoulder joints 51' between the wings and shoulders of the left side portions of the birds are opened and dislocated. Additionally, as the wings are spread outwardly, the birds are pulled against side wall 33 of the longitudinal guide rail so that a desired quantity of meat that is substantially equal to the portions of breast meat removed with the wings 22 (FIG. 3) is stretched and pulled from the breasts and backs of the birds for removal with the wings.

As shown in FIG. 3, a cutting block 77 is mounted adjacent sidewall 33 of the longitudinal guide rail 28, positioned immediately downstream from the second guide sprocket 75. The cutting block generally is substantially cubically shaped and is formed from nylon or other plastic material. An angled bearing surface 78 is formed on the upper surface of the cutting block, aligned with the path of movement of the birds. The angled bearing surface is positioned so that the opened shoulder joints between the wings and shoulders of the birds engage and ride over the angled bearing surface 78. The movement of the dislocated shoulder joints over the bearing surface serves to align the shoulder joints in the proper position and at the proper angle for cutting therethrough for removal of the wings 22' with additional portions of the breast meat substantially equal to the portions of breast meat removed with the wings 22 (FIG. 3) attached.

As FIGS. 1–3 illustrate, a second cutting means 81 is mounted adjacent the right sidewall 33 of the longitudinal guide rail 28, positioned immediately downstream from the guide sprocket 75 of the second guide means 41. The second cutting means is mounted on the opposite side of the longitudinal guide rail from the first cutting means 56, at a staggered interval downstream therefrom. The second cutting means is mounted along the processing path of the birds in a position to engage and cut away the wings 22' (FIG. 3) from the left side portions of the birds after the wings 22 have been removed. Together, the first and second cutting means form the cutting zone 27 in which the wings of the birds are removed at spaced intervals.

As shown in FIG. 1, the second cutting means 81 generally comprises a rotary disc cutter having a substantially circular disc cutting blade 83. A drive motor 84 for the second cutting means 81 is mounted to the adjustable framework of the wing remover 10 and includes a drive shaft 86 projecting therefrom. The cutting blade 83 is mounted to the end of the drive shaft and is rotatable. The drive motor typically is an electric motor that drives the drive shaft 86 to cause the rotation of the cutting blade 83 for cutting through the meat, tendons and ligaments between the wings and shoulders of the birds. Additionally, the adjustable mounting of the drive motor enables adjustment of the elevation and orientation of the cutting blade 83 as desired to accommodate birds of varying sizes, and to position the cutting blade at a desired alignment to insure accurate cutting of the cutting blade 83 through the dislocated shoulder joints of the birds, and to adjust the quantity of meat removed from the breasts and backs of the birds with the wings.

As FIG. 4 illustrates, a slotted opening or gap 87 is formed through the right sidewall 33 of the longitudinal guide rail 28, through which the cutting blade 83 projects. The cutting blade 83 is thus positioned to insure that the cutting blades will cut automatically and completely through the shoulder joints between wings and shoulders of the carcasses to insure complete removal of the wings.

A shield 88 (FIG. 4) is mounted over the outer edge of the cutting blade 83, partially cover the outer edge. The shield generally is a semi-circularly shaped metal plate which covers the outer edge of the cutting blade to prevent inadvertent contact therewith. A guide bar 89 is mounted to the downstream end of the shield 88 extending downwardly into the path of the wings as the wings are cut from the left side portions of the birds. The partially cut away wings engage the guide bar 89 and are urged outwardly and away from the cutting blade to keep the wings from interfering with the cutting blade during separation of the wings from the birds.

A slide 90 (FIG. 1) is positioned below the wing remover 10, sloping downwardly from a position adjacent the distal end 27 of the wing remover 10. As the wings 22 and 22' are cut from the birds 11, the wings tend to fall away from the birds as shown in FIG. 5D onto the slide. The slide directs the wings into the flights of a flighted conveyor (not shown) for removal for further processing and packaging.

Figure 6:
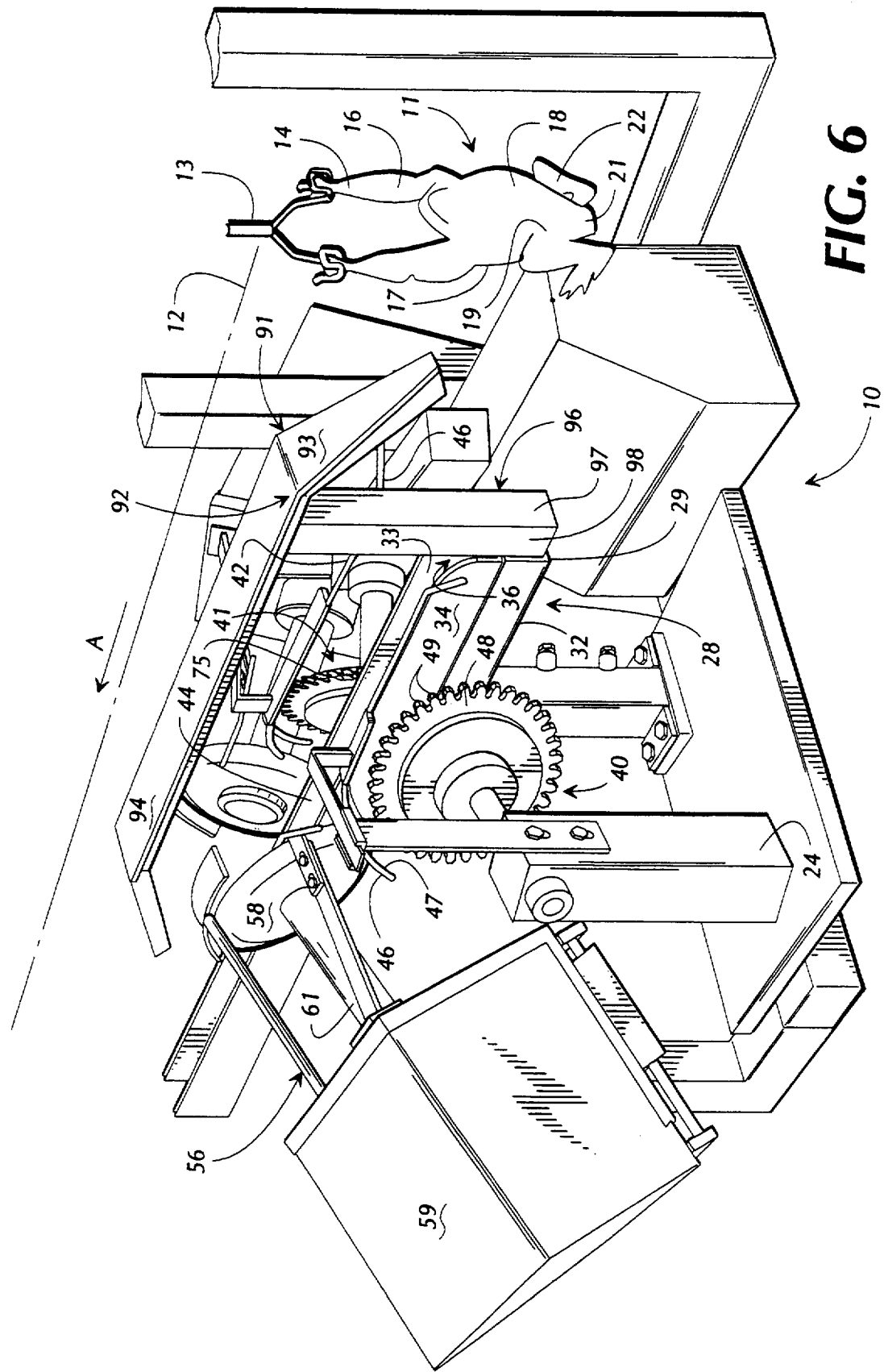
FIG. 6 is a perspective illustration of the wing remover having a bypass plate mounted to the longitudinal guide rail to enable the birds to bypass the wing remover.

As shown in FIG. 6, a bypass 91 can be mounted within the wing remover 10, to enable the birds to bypass the wing remover 10. The bypass 91 includes a guide plate 92 generally positioned at an elevation sufficient to place the guide plate in the path of movement of the birds along the overhead conveyor line. The guide plate 92 generally is formed from a metal such as stainless steel or similar material. The guide plate 92 includes a sloped portion 93 at its front end, and a substantially horizontally oriented portion 94 extending rearwardly from the sloped portion 93. The sloped portion 93 is adapted to block the passage of the birds into the wing remover and directs the birds upwardly over the wing remover. Thereafter, the birds slide along a horizontally oriented portion 94 as the birds are moved forwardly by the overhead conveyor line. A mounting post is mounted to the underside surface of the guide plate 92, and includes a vertically oriented stanchion or support 97 and a longitudinally extending base 98.

As FIG. 6 illustrates, the base 98 is received within the neck receiving channel of the longitudinal guide rail, sliding therealong to removably mount the bypass 91 to the wing remover 10. With the bypass 91 in position, the birds are directed upwardly and over the wing remover 10 so as to prevent the birds from being engaged by the wing remover when so desired. As a result, the wing remover can remain in position along the poultry cut-up line without having to be removed or otherwise disturbed when not in use.

OPERATION

As shown in FIG. 1, in the operation of the wing remover 10, the birds 11 are conveyed along a processing path in the direction of arrows A suspended by their legs from shackles 13 of an overhead conveyor line 12. The birds are conveyed with their backs 17 leading and their breasts 18 trailing, with their wings 22 partially spread outwardly. Typically, the birds will have been eviscerated but will have been uncut as the birds enter the wing remover. It is, however, possible for the birds to be partially segmented with portions of the breast of the birds removed prior to engagement by the wing remover 10.

As the birds enter the wing remover 10, the neck portions 21 of the birds are received within and slide along the neck receiving channel 36 of longitudinal guide rail 28. The birds slide along the longitudinal guide rail, moving the wings 22 on the right side portions of the birds into engagement between the teeth 49 of a first guide sprocket 48 and a first guide plate 42 and a pair of wing guide rails 45 and 46 of a first wing guide means 40 positioned adjacent the longitudinal guide rail.

As shown in FIG. 5a, the first guide sprocket is rotated in the direction of arrow B as the birds are urged along the longitudinal guide rail by the overhead conveyor line.

The rotation of the first guide sprocket tends to urge the wings along the wing guide rails, causing the wings to be pulled downwardly and to be spread outwardly. The spreading of the wings tends to pull the wings away from the carcasses of the birds, in the direction of arrow C (FIG. 3). This spreading of the wings opens and dislocates the shoulder joints 51 between the wings 22 and shoulders 19 of the birds. The spreading and pulling of the wings outwardly further tends to pull the birds against the left side wall 34 of the longitudinal guide rail. As the birds are pulled in the direction of arrow C, a desired quantity of meat from the breasts of the birds is stretched and pulled from the breasts of the birds with the wings. As illustrated in FIGS. 3 and 5b, the opened shoulder joints 51 of the birds thereafter are moved over an angled bearing surface 53 of a cutting block 52 so as to properly position the shoulder joints at a desired alignment and angle for accurate cutting therethrough.

As the birds are carried further forwardly by the overhead conveyor line, the opened shoulder joints 51 are carried into engagement with the cutting blade 58 of a first cutting means 56. The cutting blade 58 is positioned so as to cut through the opened shoulder joints between the wings 22 and shoulders 19 of the birds to separate the wings from the carcasses of the birds. The cutting blade cuts through the stretched ligaments and tendons connecting the wings and carcasses of the bird for removal of the wings therefrom with the desired quantity of breast meat pulled from the breasts of the birds with the wings also being cut free from the carcasses to provide a meatier wing.

At the same time, the wings 22 on the right side portions of the birds 11 are removed from the carcasses of the birds by the first cutting means 56, the wings 22' of the left side portions of the birds are engaged and pulled outwardly from the carcasses by a second guide means 41 (FIGS. 1 and 3). As FIGS. 3 and 5b illustrate, the wings are engaged between the teeth 76 of a second guide sprocket 75 and a second guide plate 67 and wing guide rails 71 and 72 (FIG. 1). As shown in FIGS. 3 and 5b the second guide sprocket 75 is rotated in the direction of arrow B' as the birds are pulled along the longitudinal guide rail 28. The rotation of the guide sprocket causes the wings 22' to be pulled and spread outwardly in the direction of arrow C'. As a result, the shoulder joints 51' between the wings 22' and shoulders 19' of the bird are opened and the wings are dislocated from the shoulders. At the same time, a desired quantity of breast meat is stretched and pulled from the breasts of the birds with the wings. The opened shoulder joints are thereafter conveyed over the angled bearing surface 78 of cutting block 77, to position the opened and dislocated shoulder joints at the proper alignment and angle for cutting.

Figure 5C:
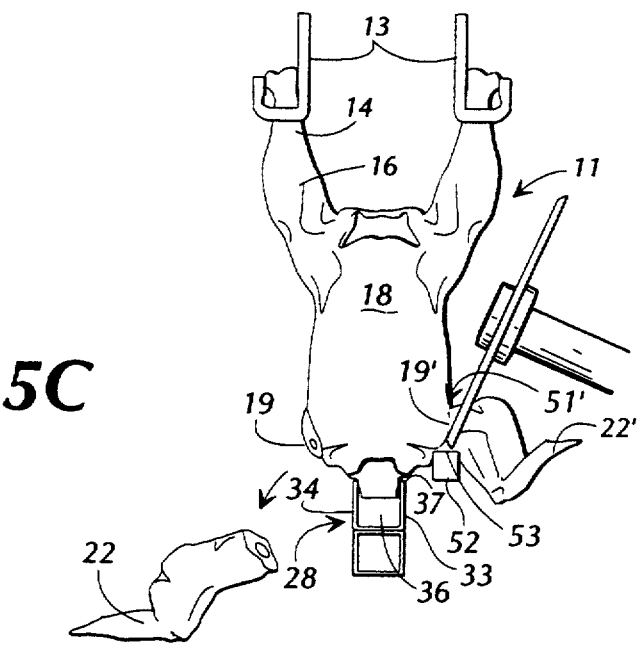
Figure 5D:
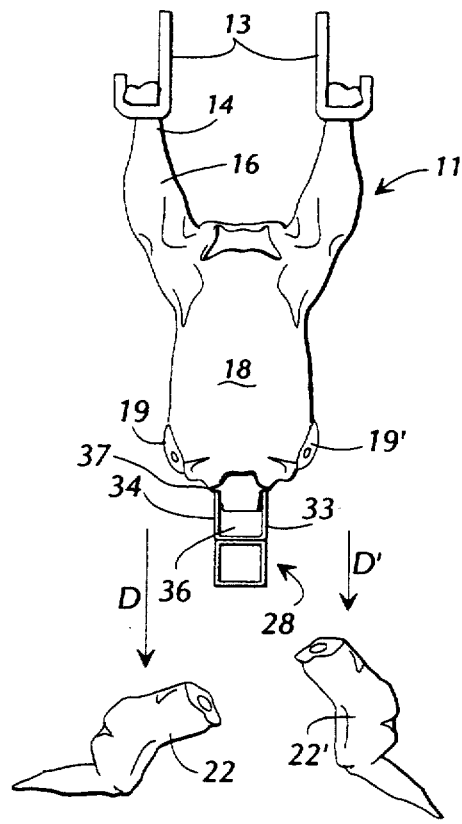

As shown in FIGS. 3 and 5c, the shoulder joints 51' are conveyed into engagement with the cutting blade 83 of a second cutting means 81. The cutting blade is positioned so as to cut through the opened shoulder joints, severing the stretched ligaments and tendons and connecting the wings to the carcasses of the bird. As a result, the wings 22' are separated from the carcasses of the birds, with a quantity of breast meat being removed therewith to provide meatier wings 22' that are substantially equal in size and weight to the wings 22 (FIG. 5B) removed from the right side portions of the birds.

As shown in FIG. 5d, as the wings are cut away from the birds, the wings drop through the lower part of the wing remover 10 (FIG. 1) and onto a slide 90. The slide directs the cut wings away from the wing remover 10 and into the flights of a lighted conveyor positioned beneath the poultry cut-up line and moving in timed sequence with the movement of the birds therealong. Thereafter, the birds are removed for further processing and packaging.

The present wing remover thus provides a method and apparatus for removing the wings of birds with a desired equal amount of meat from the breast, backs and/or shoulders of the birds being removed with both wings of the birds to provide for meatier wings that are of a substantially equal size according to specifications demanded by consumers and retailers such as fast food outlets. The engagement and removal of the wings from each side of the birds at staggered intervals enables the birds to be pulled to each side as the wings are spread and dislocated from the shoulder joints so as to position the birds to insure accurate cutting through the opened shoulder joints and to insure that an equal quantity of meat will be cut from the breasts on each side of the birds for removal with the wings. Further, the adjustability of the wing remover enables the amount of breast meat removed with the wing to be adjusted as desired to meet particular specifications of a retail purchaser as desired.

It will be understood that the foregoing relates only to a preferred embodiment of the present invention, and numerous changes and modifications can be made thereto without departing from the spirit and scope of the invention as set forth in the following claims.

We claim:

1. Apparatus for removing the wings from the carcasses of birds moving in series suspended by their legs from an overhead conveyor line with their backs leading their breasts, comprising:

an elongated longitudinal guide rail positioned to receive and guide the birds along a processing path through a cutting area;

a first guide sprocket mounted adjacent said longitudinal guide rail, positioned along the processing path of the birds at an angle thereto so as to engage one of the wings of each bird and urge the wing away from the bird to at least partially dislocate the wings from the carcasses;

first cutting means positioned downstream from said first sprocket along said guide rail for cutting between the wings and carcasses of the birds to remove the wings therefrom; and a second guide sprocket mounted on an opposite side of said guide rail from said first sprocket, downstream from said first guide sprocket, positioned along the processing path of the birds at an angle thereto so as to engage and urge the other wing of each bird away from the carcass of the bird to at least partially dislocate the wings from the carcasses; and second cutting means positioned downstream from said second sprocket along said guide rail for cutting between the wing and the carcass of each bird to remove the other wings therefrom.

2. The apparatus of claim 1 and further comprising a series of guide rods that extend along the processing path of the birds, diverging therefrom adjacent said first and second guide sprockets, bearing surfaces against which the wings are engaged as the wings are spread outwardly by said guide sprockets to open the joints between the wings and carcasses.

3. The apparatus of claim 1 and wherein said longitudinal guide rail comprises a substantially U-shaped beam having a neck receiving channel formed therealong.

4. The apparatus of claim 1 and further including an adjustable framework on which said first and second guide sprockets and said first and second cutting means are mounted to enable adjustment of said guide sprockets and said cutting means to accommodate various sized birds.

5. Apparatus for removing the wings from a series of birds at the shoulder joints between the wings and the carcasses of the birds while the birds are moved in spaced series along a processing path, comprising:

support means for supporting and aligning the birds as the birds are moved along their processing path;

means for spreading the wings outwardly from the carcasses of the birds, positioned adjacent said support means along the processing path of the birds so as to engage the wings on each side of each bird at staggered intervals;

cutting blades mounted at staggered intervals on opposite sides of said support means, positioned downstream from said means for spreading the wings and adapted to engage and cut through the shoulder joints between the wings and carcasses of the birds at spaced intervals;

whereby as the birds are moved along their processing path, the wings of the birds engage said means for spreading the wings, which spreads the wings away from the carcasses of the birds, causing the shoulder joints between the wings and carcasses to open and be dislocated and pulling a desired quantity of meat from the breasts of the birds to remain with the wings for cutting therethrough by said cutting blades to separate the wings from the carcasses with a portion of breast meat remaining attached to the wings.

6. The apparatus of claim 5 and wherein said support means comprises a longitudinally extending guide rail aligned with the processing path of the birds.

7. The apparatus of claim 5 and wherein said means for spreading the wings comprises a first rotatable sprocket positioned along said support means diverging outwardly from the processing path of the birds such that as a wing on one side of each carcass engages said sprocket, the wing is urged away from its carcass, and a second rotatable sprocket positioned on an opposite side of said support means from said first sprocket, downstream from said first sprocket and diverging outwardly from the processing path of the birds such that as the wing on the other side of the bird engages the sprocket, the wing is urged away from its carcass.

8. The apparatus of claim 7 and further including an adjustable framework on which said first and second guide sprockets and said first and second cutting means are mounted to enable adjustment of the positions of said guide sprockets and said cutting means to accommodate various size birds.

9. The apparatus of claim 7 and further including wing guide rods mounted on each side of said support means and extending therealong, and against which the wings are engaged by said sprockets for urging the wings outwardly to a position spread apart from the carcasses.

10. A method of removing the wings one at a time from the carcasses of birds suspended by their legs and moving in spaced series along a poultry processing line, comprising the steps of:

engaging a wing on one side of each of the carcasses with a first guide means;

urging with the guide means the wings on the one side of the carcasses outwardly from the carcasses to open the shoulder joints between the wings and the carcasses;

cutting with a first cutting means through the open shoulder joints between the wings and carcasses on the one side of the carcasses to remove the wings from the carcasses;

as the wings on the one side of the carcasses are being removed from the carcasses, engaging the wings on the other side of each of the carcasses with a second guide means;

urging the wings on the other side of the carcasses outwardly away from the carcasses to open the shoulder joints between the wings and the carcasses; and cutting with a second cutting means through the open shoulder joints between the wing and carcasses on the other side of the carcasses to remove the wings from the carcasses.

11. The method of claim 10 and further including the steps of moving the birds into engagement with a guide rail to stabilize and position the birds and moving the birds along the guide rail through a cutting zone for removal of the wings by the first and second cutting means.

12. The method of claim 11 and further including the step of isolating and aligning the opened shoulder joints prior to cutting therethrough for removal of the wings by the first and second cutting means.

13. A method of removing wings one at a time from poultry carcasses, comprising the steps of:

transporting a plurality of carcasses in spaced series suspended by their legs along a processing path;

as each carcass is transported along the processing path, moving each carcass into engagement with guide means extending along the processing path and stabilizing the carcasses with the guide means;

urging a first wing on one side of the carcass away from the carcass in a direction to open the shoulder joint between the carcass and the first wing;

cutting through the shoulder joint of the first wing while the shoulder joint is opened and removing the first wing from the carcass;

urging the second wing on the other side of the carcass away from the carcass to open the shoulder joint between the second wing and the carcass; and after the first wing has been cut and removed from the carcass, cutting through the shoulder joint of the second wing while the shoulder joint is opened and removing the second wing from the carcass.

14. The method of claim 13 and further including the steps of:

urging the carcass in a first direction laterally of the processing path toward a first cutter as the first wing is cut from the carcass, and urging the carcass laterally in a second direction generally opposite to the first direction toward the second cutter as the second wing is cut from the carcass.

* * * * *